United States Patent [19]

Kobayashi et al.

[11] Patent Number: 4,594,167

[45] Date of Patent: Jun. 10, 1986

[54] FOAM FIRE-EXTINGUISHING COMPOSITION

[75] Inventors: Toshiaki Kobayashi, Kyoto; Shizuo Terasawa, Kashihara; Giichi Akazome, Kyoto; Koichi Murai, Nagaokakyo, all of Japan

[73] Assignee: New Japan Chemical Co., Ltd., Japan

[21] Appl. No.: 617,086

[22] PCT Filed: Sep. 27, 1982

[86] PCT No.: PCT/JP82/00391

§ 371 Date: May 22, 1984

§ 102(e) Date: May 22, 1984

[87] PCT Pub. No.: WO84/01302

PCT Pub. Date: Apr. 12, 1984

[51] Int. Cl.[4] ......................... A62C 1/12; A62D 1/02; C09K 3/00

[52] U.S. Cl. .......................................... 252/3; 169/66; 252/8.05; 252/307; 252/350; 252/351; 252/352; 252/382

[58] Field of Search ....................... 252/606, 3, 2, 4, 5, 252/6, 307, 382, 6.5, 8.05, 350, 351, 352, 356, 357; 169/65, 66, 67, 68

[56] References Cited

U.S. PATENT DOCUMENTS

| | | | |
|---|---|---|---|
| 4,203,850 | 5/1980 | Wirtz et al. | 252/3 |
| 4,419,473 | 12/1983 | Mahaffey, Jr. | 524/104 |
| 4,429,140 | 1/1984 | Murai et al. | 549/370 |
| 4,431,759 | 2/1984 | Dusenbury et al. | 524/108 |
| 4,442,018 | 4/1984 | Rand | 252/3 |

*Primary Examiner*—Stephen J. Lechert, Jr.
*Assistant Examiner*—Howard J. Locker
*Attorney, Agent, or Firm*—Larson and Taylor

[57] ABSTRACT

This invention provides a foam fire-extinguishing composition containing (a) dibenzylidene sorbitol, dibenzylidene xylitol or the derivative thereof substituted at the nucleus, (b) a surfactant, (c) a stabilizer, (d) a polar organic solvent and (e) water. The composition of the present invention is suitable for extinguishing a fire of organic solvents, particularly polar organic solvents.

4 Claims, No Drawings

FOAM FIRE-EXTINGUISHING COMPOSITION

TECHNICAL FIELD

This invention relates to foam fire-extinguishing compositions and more particularly to foam fire-extinguishing compositions especially suitable for effectively extinguishing fires of organic solvents.

With the development of petro-chemical industry, gigantic tanks containing various kinds of inflammable organic solvents have been installed in chemical complexes, chemical plants and the like. Further, huge vessels have been built in recent years and there are sailing such vessels fully loaded with organic solvents or the like. These tanks and vessels are well equipped with fire extinguishing systems and caution is being exercised to prevent hazards, since there will be a serious danger if the organic solvents in the tanks and on the vessels catch fire. However, conventional methods of extinguishing fires of alcohols, ketones, lower amines, low-boiling esters or like polar organic solvents are not fully satisfactory and remain to be improved in many respects. Since generally application of water is not adequate to extinguish a fire of organic solvents, the fire is usually put out by using a large amount of foam produced from an aqueous solution of a surfactant or the like to eliminate contact between the fire and air. However, when a conventional foam fire-extinguishing composition is used, the foam tends to be quickly destroyed at the interface between the foam and the polar organic solvent upon its contact with the polar organic solvent, thus failing to produce sufficient foam fire extinguishing effect. Although aqueous solutions of protein hydrolysate are known as a foam fire-extinguishing composition, the solutions are not fully effective in extinguishing the fire of polar organic solvents and are poor in storage stability due to their susceptibility to putrefaction, etc. Known foam fire-extinguishing compositions also include aqueous solutions of fluorinated surfactants, which, however, have the drawbacks of extinguishing such fire with unsatisfactory efficiency and being expensive.

Research is underway to develop foam fire-extinguishing compositions comprising a fluorinated surfactant in combination with a water-soluble polymer. Although having good properties, the compositions suffer the defects of: being difficult to handle because of their high viscosity which is likely to cause clogging in a foaming device, a nozzle, a line and the like; having a low storage stability at low temperatures in winter; being costly; etc.

Foam fire-extinguishing compositions containing dibenzylidene sorbitol were proposed (Japanese Unexamined Patent Publication No. 150897/1979). The proposed compositions are disadvantageous in that they cause gellation when mixed with water to produce foam, creating clogging in the lines.

The present invention has been accomplished to overcome the drawbacks of the conventional foam fire-extinguishing compositions as described above.

DISCLOSURE OF INVENTION

The present invention provides a foam fire-extinguishing composition comprising:

(a) 0.3 to 15% by weight of at least one compound represented by the formula

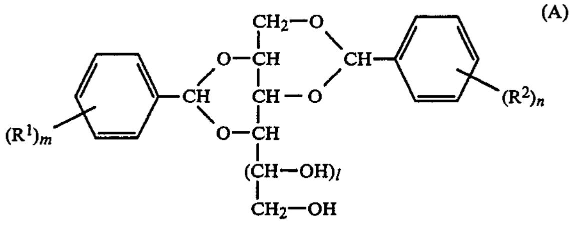

(A)

wherein $R^1$ and $R^2$ are the same or different and are each hyerogen atom, alkyl or alkoxy group having 1 to 3 carbon atoms, l is 0 or 1, and m and n are an integer of 1 to 3, with the proviso that when $R^1$ and $R^2$ are alkoxy, m and n are 1;

(b) 1 to 30% by weight of a surfactant;

(c) 0.5 to 20% by weight of at least one member selected from aliphatic monohydric alcohol, aliphatic polyhydric alcohol, glycol ethers and ethylene carbonate and/or 0.1 to 5% by weight of a water-soluble polymer;

(d) 1 to 50% by weight of a polar organic solvent which is a good solvent of the component (a); and (e) 50 to 97% by weight of water.

The foam produced from the foam fire-extinguishing composition of the present invention retains stability for a prolonged period of time and can not be easily destroyed on contact with the polar organic solvent. Further, according to the use of the present composition, reignition would not occur since the resulting foam prevents air from reaching the fire and additionally the burning organic solvent is gelled at its surface by the compound of the formula (A) contained in the composition of the invention so that the gelled surface of the organic solvent also prevents air from reaching the fire. The present fire extinguishing compositions, moreover, can effectively extinguish the fire of a wide variety of organic solvents, particularly the fire of polar organic solvents which has been difficult to extinguish. The present compositions are relatively inexpensive and excellent in storage stability and do not cause the gellation at the early stage of foam formation despite the presence of the compound of the formula (A).

The foregoing effects can be produced only when the above-specified components (a) to (e) are used in the specified amounts. When any one of the components (a) to (e) is absent in the composition, the foregoing excellent effects can not be attained.

The compounds of the formula (A) used as the component (a) in the present invention are dibenzylidene sorbitol, dibenzylidene xylitol and the derivatives thereof having substituents on the phenyl ring of their benzylidene group. The derivatives having substituents on the phenyl ring are the compounds having 1 to 3 alkyl groups with 1 to 3 carbon atoms or one alkoxy group with 1 to 3 carbon atoms at an optional position on the phenyl ring of each benzylidene group. The compounds of the formula (A) can be used singly or at least two of them are usable in admixture. These compounds are used in an amount of 0.3 to 15% by weight, preferably 0.7 to 10% by weight, based on the total amount of the composition.

The surfactants used as the component (b) can be any of anionic, cationic, nonionic and ampholytic surfactants. Exemplary of the anionic surfactants are those of the alkyl sulfate type, alkyl ether sulfate type, olefin sulfonate type and alkylbenzenesulfonate type, fatty acid soap, etc. Representative of the cationic surfactants are those of the quaternary ammonium salt type, amine oxide type, etc. Illustrative of the nonionic surfactants are polyoxyethylene alkyl ether type, sorbitan fatty acid ester type, polyoxyethylene alkyl phenyl ether type, fatty acid alkylolamide type, fatty acid amide type, saccharose esters of fatty acid type, etc. Examples of the ampholytic surfactants are those of the alkyl imidazoline salt type and the like. Various fluorine-containing surfactants are also useful. Among these surfactants, anionic surfactants or a mixture of anionic surfactant and other surfactant is preferable to use because they tend to give a higher foaming ratio. These surfactants can be used singly or at least two of them are usable in admixture. The surfactant is employed in an amount of 1 to 30% by weight, preferably 2 to 15% by weight, based on the total amount of the composition.

The component (c) acts as a stabilizer in the present invention. More specifically stated, the component (c) has a function of giving strength to the foam produced with use of the present composition, thereby to increase the extinction efficiency and a function of providing the composition with an improved storage stability. Useful stabilizers include aliphatic monohydric alcohols, aliphatic polyhydric alcohols, glycol ethers, water-soluble polymers, etc. Preferred aliphatic monohydric alcohols are those having 1 to 14 carbon atoms. Exemplary of the aliphatic polyhydric alcohols are ethylene glycol, diethylene glycol, triethylene glycol, tetraethylene glycol, propylene glycol, dipropylene glycol, tripropylene glycol, tetrapropylene glycol, glycerin, diglycerin, triglycerin, etc. Suitable examples of the glycol ethers are ethylene glycol methyl ether, ethylene glycol ethyl ether, diethylene glycol methyl ether, diethylene glycol ethyl ether, diethylene glycol butyl ether, triethylene glycol methyl ether, etc. Ethylene carbonate is also usable. These stabilizers are usable singly or at least two of them can be used in admixture. The stabilizer is used in an amount of 0.5 to 20% by weight, preferably 1 to 15% by weight, based on the total amount of the composition. Exemplary of the water-soluble polymers are polyethylene glycol having a molecular weight of about 5,000 to 200,000; polypropylene glycol having a molecular weight of about 2,000 to about 150,000; carboxymethyl cellulose, methyl cellulose, hydroxypropyl cellulose and like cellulose derivatives; polyvinyl alcohol having a polymerization degree of about 300 to about 2,700; polyvinyl pyrrolidone having a polymerization degree of about 100 to about 2,000; polyacrylamide having a polymerization degree of about 100 to about 2,500; vinyl acetate-vinyl pyrrolidone copolymer having a molecular weight of about 5,000 to about 200,000; polyethylene imine having a molecular weight of about 5,000 to about 200,000; etc. The water-soluble polymers serving as a stabilizer can be used singly or at least two of them are usable in admixture. The amount of the polymer to be used is 0.1 to 5% by weight, preferably 0.3 to 3% by weight, based on the total amount of the composition. The water-soluble polymer can be used conjointly with the foregoing stabilizer such as aliphatic monohydric alcohol.

According to the present invention, it is essential to use a polar organic solvent as the component (d). Useful polar organic solvents are good solvents of the compound of the formula (A), such as N-methyl-2-pyrrolidone, N-vinyl-2-pyrrolidone, N-isopropyl-2-pyrrolidone, N-cyclohexyl-2-pyrrolidone, cyclohexanone, dimethyl sulfoxide, sulfolane, morpholine, N,N-dimethylfomamide, N, N-dimethylacetamide, N,N-dimethylacrylamide, etc. These polar organic solvents can be used singly or at least two of them are usable in admixture. The amount of such solvent is 1 to 50% by weight, preferably 2 to 30% by weight, based on the total amount of the composition.

Water is used as the component (e) in the present invention. In view of the conveniences in the manufacture of the composition, it is preferred to employ warm water at about 30° to about 90° C. When the amount of water to be used is 50 to 97% by weight, preferably 70 to 96% by weight, based on the total amount of the composition, good results are generally achieved.

The foam fire-extinguishing composition of the present invention can be prepared by mixing the components (a) to (e) as follows. The components (a) to (d) are mixed together with heating at about 50° to about 120° C. to obtain a uniform mixture. Then the uniform mixture is added in small amounts to water at about 30° to about 90° C., or water at about 30° to about 90° C. is added in small amounts to the uniform mixture, while vigorously stirring or homogenizing the whole mixture until a homogeneous dispersion is obtained. Alternatively, the present composition can be prepared as follows: The components (a) and (d) are mixed together at about 50° to about 120° C. to obtain a uniform solution. Separately, the components (b), (c) and (e) are mixed at about 30° C. to about 90° C. to obtain a uniform mixture. Then, the uniform solution is slowly added to the uniform mixture while vigorously agitating or homogenizing the whole mixture until it becomes a homogeneous dispersion. The foam fire-extinguishing composition of the present invention thus obtained can be maintained in a fluid state free from gelation and can take various forms, depending on the kinds and amounts of the components to be used, such as those from a colloidal aqueous solution having a low viscosity to a pasty viscous mixture.

The present composition, being an aqueous composition, can be used conjointly with the conventional aqueous solution of protein hydrolysate, aqueous solution of aluminium metal soap or like aqueous fire-extinguishing composition. Particularly the use of the present composition in combination with the aqueous solution of protein hydrolysate was found to give good results such as a further increase in foaming ratio to improve fire extinguishment efficiency and more reduced tendency of foam destruction. Useful protein hydrolysates include both of those produced from animals and those from vegetables. For example, such protein hydrolysate can be prepared by partially hydrolyzing the protein derived from soybean cake, blood, powdered blood, casein, fish scales, hooves, horns, hairs or the like, by the usual method, e.g. as disclosed in Japanese Examined Patent Publication No. 5600/1960. The protein hydrolysate is formulated into a 3 to 30 wt % aqueous solution. The aqueous solution is mixed with the present composition in an amount of about 3 to about 100 parts by weight per 100 parts by weight of the composition. When an aqueous solution of protein hydrolysate is conjointly used, it is preferred to add a compound which serves to improve the strength of foam and to promote the coagulation of protein. Useful compounds for this purpose include compounds capable of forming ferrous ion such as ferrous sulfate, ferrous hydroxide, ferrous chloride, etc.; compounds capable of forming boric acid ion such as boric acid, sodium borate, etc.; compounds capable of forming zinc ion such as zinc chloride, zinc hydroxide, etc.; inorganic compounds capable of forming aluminium ion such as aluminium hydroxide, aluminium nitrate, aluminium sulfate, etc.; compounds capable of forming magnesium ion such as magnesium carbonate, magnesium chloride, etc.; compounds capable of forming phosphoric acid ion such as sodium tripolyphosphate; and the like. Colloidal silica is also usable. The amount of the foregoing compound to to used, although variable depending on the kind and the amount of the protein hydrolysate, is usually in the range of 0.05 to 5 parts by weight per 100 parts by weight of the present composition.

Even when the aqueous solution of protein hydrolysate is not added, the compounds capable of producing ferrous ions and the like compounds listed hereinabove can be incorporated in the present composition and can increase the storage stability of the present composition. The amount of the compound to be used for this purpose is the same as stated above, i.e. 0.05 to 5 parts by weight per 100 parts by weight of the present composition.

The present composition can also be used conjointly with aluminium metallic soap. In that case, the fire can be extinguished with a less amount of foam than when using only the present composition. Preferred aluminium metallic soaps are those of fatty acid having 12 to 22 carbon atoms such as aluminium stearate. The soaps can be used singly or at least two of them are usable in admixture. The amount of the soap to be used is about 0.5 to about 3 parts by weight per 100 parts by weight of the total amount of the present composition, whereby a preferable result is usually produced.

Foam can be produced with use of the present foam fire-extinguishing composition or a mixture of the present composition and an aqueous solution of protein hydrolysate or aluminium metallic soap by the conventional method, for example, by ejecting the composition or mixture through a nozzle, spraying the same through a nozzle to a net, ejecting the same through a nozzle of a usual fire extinguisher containing the same, or blowing air into the same or by mechanical agitation. In this case, the composition or the mixture can be formed into foam by itself or as diluted with water about 10- to about 40-fold. The foam thus produced is excellent in storage stability and can not be easily destroyed on contact with a polar organic solvent as well as a nonpolar organic solvent. The foam is ejected toward the flames by the conventional method to interrupt air, whereby the fires of various organic solvents can be extinguished.

The present invention will be described below in more detail with reference to the following Examples and Comparison Examples in which the foaming ratio and 25% drainage time were determined as follows: 1. Foaming ratio The foaming ratio is given by the following equation:

$$\text{Foaming ratio} = Y/X$$

wherein x is the volume of composition consumed in foam formation and Y is the volume of foam produced. 2. 25% Drainage time The foam was placed in a measuring cylinder and time was measured until the height of the foam in the cylinder was reduced to $\frac{1}{4}$. Usually time of 60 minutes or longer is rated as preferable.

EXAMPLE 1

There were mixed together 4 g of dibenzylidene sorbitol, 3 g of lauryl sulfate, 3 g of diethanol amide of coconut fatty acid, 3.5 g of N,N-dimethylformamide, 4 g of dimethyl sulfoxide and 2 g of glycerin at 70° C. to obtain a uniform solution. A 300 ml quantity of warm water at 70° C. was gradually added to the solution while vigorously stirring the mixture with use of a three-bladed stirrer, and the mixture was further homogenized by a homogenizer at 3000 rpm, wherely a colloidal fire-extinguishing composition is produced with the components uniformly dispersed.

Into a dish 10 cm in diameter was placed 80% ethanol to a depth of 1 cm and the ethanol was ignited. The foregoing fire-extinguishing composition was gushed out in foam through a low-foaming nozzle which was manufactured according to the standard nozzle specified by the Japanese Ministry of Home Affairs for a synthetic surfactant type fire foam composition. The foaming ratio of the composition was 6 times and 25% drainage time was over 80 minutes. The ethanol fire was easily extinguished by 10 ml of the above foam. A gel phase was formed at the interface between the ethanol and the foam so that no reignition was caused when light was brought close to the ethanol.

COMPARISON EXAMPLE 1

A fire-extinguishing composition was prepared by using 3 g of lauryl sulfate, 3 g of diethanol amide of coconut fatty acid and 300 ml of water. A fire-extinguishing test was conducted by foaming the composition in the same manner as Example 1. However, the foam was quickly destroyed and the fire was not extinguished even with 20 ml of the foam.

EXAMPLE 2

There were mixed together 8 g of bis(methylbenzylidene)sorbitol, 8 g of trimethyllauryl ammonium chloride, 1 g of nonylphenol ethylene oxide (10 moles) adduct, 0.8 g of polyethylene glycol (molecular weight: about 100,000), 1 g of ethylene carbonate, 8 g of N,N-dimethylacetamide and 10 g of N-methyl-2-pyrrolidone at 75° C. to obtain a uniform solution. The solution was uniformly dispersed in 400 ml of warm water at 80° C. in the same manner as Example 1 to give a fire-extinguishing composition according to the present invention. The composition thus obtained was made into foam using a low-foaming nozzle used in Example 1. Foaming ratio thereof was 4 times and 25% drainage time was over 80 minutes. The foam was subjected to a fire-extinguishing test with respect to a mixture of 50% methanol and 50% butanol in the same manner as Example 1. The fire was extinguished by 10 ml of the foam. A gel phase was formed on the surface of the methanol-butanol mixture and reignition did not occur even when light was brought close to the mixture.

EXAMPLE 3

To 300 ml of the fire-extinguishing composition prepared in Example 1 were added 1 g of ferrous hydroxide, 0.5 g of boric acid, 200 ml of a 10% aqueous solution of protein hydrolysate and 0.5 g of a fluorinated anionic surfactant (trademark "MEGAFAC F-120", product of Dainihon Ink Kagaku Kogyo Kabushiki Kaisha) and these components were mixed together. While being further mixed with 5 liters of water, the mixture was made into foam using the same low-foaming nozzle as used in Example 1. The foaming ratio was 8 times and 25% drainage time was over 80 minutes. A fire-extinguishing test was also conducted in the same manner as in Example 1 by using the foam with respect to a mixture of 50% methanol and 50% butanol. The fire was put out by 8 ml of the foam. The use of the aqueous solution of protein hydrolysate improved the foaming ratio, and therefore is economically advantageous. After the test, the gel phase was found to have been formed with a great thickness at the surface of the methanol-butanol mixture.

EXAMPLE 4

A 3 g quantity of aluminium stearate was added to 300 ml of the composition prepared in Example 1. While being mixed with 6 liters of water, the mixture was made into foam using the same low-foaming nozzle as used in Example 1. The foam was found to have a foaming ratio of 6 times and 25% drainage time was over 80 minutes. The foam was more viscous than the foam produced from the composition of Example 1. When tested for fire-extinguishing effect in the same manner as Example 1 using 80% ethanol, 9 ml of the foam was needed to extinguish the fire.

EXAMPLE 5

Dibenzylidene xylitol: 8 g
Trimethyl lauryl ammonium chloride: 8 g
Nonyl phenol ethylene oxide (10 moles) adduct: 1 g
Ethylene glycol methyl ether: 0.5 g
Polypropylene glycol (molecular weight: 7,000): 1 g
N,N-dimethylacetamide: 8 g
N-methyl-2-pyrrolidone: 10 g The fire extinguishing composition of the present invention was prepared from the above-listed compounds in the same manner as Example 2 and was made into foam. The foam was found to have a foaming ratio of 5 times and 25% drainage time was over 80 minutes. Fire-extinguishing tests were carried out using the foam with respect to methanol, methyl isobutyl ketone, butanol, butyl acetate and gasoline. Satisfactory results were obtained in each case.

COMPARISON EXAMPLE 2

Fire-extinguishing tests were conducted in the same manner as in Example 5 with the exception of using as a fire-extiguishing composition a 15 wt % aqueous solution of protein hydrolysate (partially hydrolyzed protein obtained from bovine hoof and horn). The foam was effective against gasoline fire, but insufficient effect resulted against the fires of methanol, methylisobutyl ketone, butanol and butyl acetate.

EXAMPLE 6

Sorbitol (1 mole), benzaldehyde (1 mole) and p-tolualdehyde (1 mole) were reacted by the usual method to give a 1:2:1 dibenzylidenesorbitol/benzylidene-(p-toluylidene) sorbitol/di(p-toluylidene) sorbitol mixture.

There were mixed together 7 g of the mixture, 3 g of lauryl ammonium sulphate, 2 g of lauryl dimethyl oxide, 2 g of a fluorinated anionic surfactant (trademark "MEGAFAC F-120", product of Dainihon Ink Kagaku Kogyo Kabushiki Kaisha), 1 g of carboxymethyl cellulose and 25 g of N,N-dimethylacetamide at 90° C. to obtain a uniform solution. The solution was gradually added to 300 ml of warm water at 80° C. and uniformly dispersed in the same manner as Example 1, giving a pasty viscous product. The same fire-extinguishing test as in Example 1 was carried out with the result that the fire of 80% ethanol was completely extinguished by 8 ml of the foam.

COMPARISON EXAMPLE 3

The following components were mixed together at 50° C., giving a uniform solution having the composition as indicated below.

Dibenzylidene sorbitol: 5 wt %
Polyoxyethylene nonyl phenyl ether: 15 wt %
Lauryl alcohol: 5 wt %
Dimethylformamide: 75 wt %

A 50 ml portion of the foregoing uniform solution was added at a time to 300 ml of water at room temperature and the mixture was stirred by a magnetic stirrer in an attempt to produce foam, but foam was not produced because gelation of the whole mixture took place.

COMPARISON EXAMPLE 4

Water was introduced into a line from a hydrant and mixed, in the line, with a portion of the uniform solution obtained in Comparison Example 3 at a ratio of 300 parts by volume of water/50 parts by volume of the solution in an attempt to form foam, but foam was not formed because of clogging in the line caused by the gelation.

We claim:

1. A foam fire-extinguishing composition comprising:

(a) 0.3 to 15% by weight of at least one compound represented by the formula

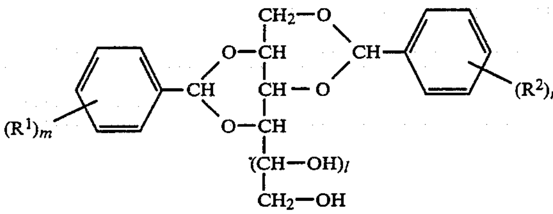

(A)

wherein $R^1$ and $R^2$ are the same or different and are each hydrogen atom, alkyl or alkoxy group having 1 to 3 carbon atoms, l is 0 or 1, and m and n are an integer of 1 to 3, with the proviso that when $R^1$ and $R^2$ are alkoxy, m and n are 1;

(b) 1 to 30% by weight of a surfactant selected from the group consisting of alkyl sulfate, alkyl ether sulfate, olefin sulfonate, alkylbenzenesulfonate, fatty acid soap, quaternary ammonium salt, amine oxide, polyoxyethylene alkyl ether, sorbitan fatty acid ester, polyoxyethylene alkyl phenyl ether, fatty acid alkylolamide, fatty acid amide, saccharose esters of fatty acid, alkyl imidazoline salt and fluorine-containing surfactant;

(c) 0.5 to 20% by weight of at least one member selected from aliphatic monohydric alcohol having 1 to 14 carbon atoms, ethylene glycol, diethylene glycol, triethylene glycol, tetraethylene glycol, propylene glycol, dipropylene glycol, tripropylene glycol, tetrapropylene glycol, glycerin, diglycerin, triglycerin, ethylene glycol methyl ether, ethylene glycol ethyl ether, diethylene glycol methyl ether, diethylene glycol ethyl ether, diethylene glycol butyl ether, triethylene glycol methyl ether and ethylene carbonate and/or 0.1 to 5% by weight of a water-soluble polymer selected from the group consisting of polyethylene glycol having a molecular weight of about 5,000 to 200,000, polypropylene glycol having a molecular weight of about 2,000 to about 150,000 carboxymethyl cellulose, methyl cellulose, hydroxypropyl cellulose, polyvinyl alcohol having a polymerization degree of about 300 to about 2,700, polyvinyl pyrrolidone having a polymerization degree of about 100 to about 2,000, polyacrylamide having a polymerization degree of about 100 to about 2,500, vinyl acetate-vinyl pyrrolidone copolymer having a molecular weight of about 5,000 to about 200,000 and polyethylene imine having a molecular weight of about 5,000 to about 200,000;

(d) 1 to 50% by weight of a polar organic solvent which is a good solvent of the component (a) and which is selected from the group consisting of N-methyl-2-pyrrolidone, N-vinyl-2-pyrrolidone, N-isopropyl-2-pyrrolidone, N-cyclohexyl-2-pyrrolidone, cyclohexanone, dimethyl sulfoxide, sulfolane, morpholine, N,N-dimethylfomamide, N,N-dimethylacetamide and N,N-dimethylacrylamide; and (e) 50 to 97% by weight of water.

2. A composition as defined in claim 1 which further contains about 3 to about 100 parts by weight of an aqueous solution of protein hydrolysate, per 100 parts by weight of the composition.

3. A composition as defined in claim 1 which contains at least one member selected from a compound capable of forming ferrous ion, compound capable of forming boric acid ion, compound capable of forming zinc ion, inorganic compound capable of forming aluminum ion, compound capable of forming magnesium ion, compound capable of forming phosphoric acid ion and colloidal silica, in an amount of 0.05 to 5 parts by weight per 100 parts by weight of the composition.

4. A composition as defined in claim 1 which further contains an aluminum metallic soap in an amount of about 0.5 to about 3 parts by weight per 100 parts by weight of the composition.

* * * * *